(12) United States Patent  
Anastasia et al.

(10) Patent No.: US 10,900,798 B2  
(45) Date of Patent: Jan. 26, 2021

(54) ELECTRONIC DEVICE AND METHOD FOR SCHEDULING TRIP

(71) Applicants: Hyundai Motor Company, Seoul (KR); Kia Motors Corporation, Seoul (KR)

(72) Inventors: Yarygina Anastasia, Seoul (KR); Jimin Han, Gyeonggi-do (KR); Jung Mi Park, Gyeonggi-do (KR); Jia Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 16/101,623

(22) Filed: Aug. 13, 2018

(65) Prior Publication Data

US 2019/0226863 A1  Jul. 25, 2019

(30) Foreign Application Priority Data

Jan. 22, 2018  (KR) .................. 10-2018-0007791

(51) Int. Cl.
```
G01C 21/36    (2006.01)
G06Q 50/30    (2012.01)
G06Q 10/02    (2012.01)
G06Q 30/02    (2012.01)
G01C 21/34    (2006.01)
```

(52) U.S. Cl.
CPC ..... *G01C 21/3614* (2013.01); *G01C 21/3438* (2013.01); *G01C 21/3664* (2013.01); *G01C 21/3697* (2013.01); *G06Q 10/02* (2013.01); *G06Q 30/0283* (2013.01); *G06Q 50/30* (2013.01)

(58) Field of Classification Search
None
See application file for complete search history.

(56) References Cited

U.S. PATENT DOCUMENTS

| 9,562,785 B1 | 2/2017 | Racah et al. |
| 2009/0055513 A1 | 2/2009 | Berry et al. |
| 2012/0016585 A1* | 1/2012 | Muthuramalingam ..................... G06Q 10/10 701/527 |

(Continued)

FOREIGN PATENT DOCUMENTS

| JP | 2003186959 A | 7/2003 |
| JP | 2016194854 A | 11/2016 |

(Continued)

*Primary Examiner* — Jonathan M Dager  
*Assistant Examiner* — Garrett F Evans  
(74) *Attorney, Agent, or Firm* — Mintz Levin Cohn Ferris Glovsky and Popeo, P.C.; Peter F. Corless

(57) ABSTRACT

A trip scheduling device can include a touch screen display, a communication circuit configured to communicate with an external device, and a processor electrically connected with the touch screen display and the communication circuit. The processor can determine a destination corresponding to a task entered by a user of the device, display, via the touch screen display, a user interface including a map and a chatting window for a user group including the user connected by the communication circuit, and receive, via the touch screen display, an input associated with the user interface for determining a trip for the user group.

18 Claims, 10 Drawing Sheets

(56) References Cited

U.S. PATENT DOCUMENTS

2016/0034828 A1 2/2016 Sarawgi et al.
2016/0314132 A1* 10/2016 Lineberger ......... G06Q 10/1093
2018/0058863 A1* 3/2018 Meyer ................ G01C 21/3415

FOREIGN PATENT DOCUMENTS

KR  20160077613 A  7/2016
KR  20170050455 A  5/2017

* cited by examiner

ELECTRONIC DEVICE AND METHOD FOR SCHEDULING TRIP

CROSS-REFERENCE TO RELATED APPLICATION

This application is based on and claims the benefit of priority to Korean Patent Application No. 10-2018-0007791, filed on Jan. 22, 2018 in the Korean Intellectual Property Office, the disclosure of which is incorporated herein in its entirety by reference.

TECHNICAL FIELD

The present disclosure relates to vehicular technologies and, more particularly, to a method and a device that provide a user interface for scheduling a trip upon providing a car-hailing (or ride-sharing) service.

BACKGROUND

There is increasing interest in services such as car-sharing, carpool, car-hailing, and the like (hereinafter referred to as a "mobility service"), capable of providing a ride to a user using a vehicle owned by a service provider or another person. The mobility service may be provided through a service providing server and a user's personal device. For example, a user may enter information about his/her trip using the mobility service and may share a vehicle matched with the input information. The mobility service may provide a service that allows a plurality of users entering similar trips to share one vehicle.

In the case of providing a service that allows a plurality of users to share one vehicle, there is a need for the process of entering destinations by the users, grouping the users based on departure points and destinations, and providing the grouped users to a trip. When providing a trip to a plurality of users, an agreement between the plurality of users may result in reducing a required time and a service price. However, conventional user interfaces for generating the agreement between the plurality of users are insufficient.

SUMMARY

The present disclosure has been made to solve the above-mentioned problems occurring in the related art while advantages achieved by the related art are maintained intact.

An aspect of the present disclosure provides a method and a device that provide a user interface capable of easily generating agreement between users grouped in a mobility service, and setting an effective path for a plurality of users through the user interface.

The technical problems to be solved by the present disclosure are not limited to the aforementioned problems, and any other technical problems not mentioned herein will be clearly understood from the following description by those skilled in the art to which the present disclosure pertains.

According to embodiments of the present invention, a trip scheduling device may include: a touch screen display, a communication circuit configured to communicate with an external device, and a processor electrically connected with the touch screen display and the communication circuit. The processor may determine a destination corresponding to a task entered by a user of the device, may display, via the touch screen display, a user interface including a map and a chatting window for a user group including the user connected by the communication circuit, and may receive, via the touch screen display, an input associated with the user interface for determining a trip for the user group.

The processor may receive, via the touch screen display, a keyword associated with the task from the user, may display, via the touch screen display, one or more points for performing the task based on the keyword, and, when one of one or more points is selected by the user, may set the selected point to a destination.

The processor may recommend one of the one or more points based on a number of expected group members associated with each of the one or more places.

The processor may display, via the touch screen display, an expected required time of each of one or more points.

The processor may display, via the touch screen display, a map where destinations of respective users included in the user group are shown.

The processor may display, via the touch screen display, a chatting window and a map at the same time.

The processor may display, via the touch screen display, a chatting window and a map individually.

The processor may display, via the touch screen display, a map where destinations of respective users included in the user group are shown, and the map may include information about at least a part of an expected required time or an expected price associated with each of the users included in the user group.

The processor may change the destination based on an input of the user, which is made to the map.

The processor may change the information about at least a part of the expected required time or the expected price associated with the user, based on the changed destination.

The processor may display, via the touch screen display, a map where destinations of respective users included in the user group are shown.

The processor may change a departure point of the user based on an input of the user, which is made to the map.

The processor may change the information about at least a part of the expected required time or the expected price associated with the user based on the changed destination.

The user interface may include a confirmation button for receiving an agreement intention associated with the trip from the user.

The user interface may indicate whether users included in the user group agree to the trip.

When it is determined that all users includes in the user group agree to the trip, the processor may display, via the touch screen display, a screen indicating finalization of the trip.

The processor may display, via the touch screen display, one or more hash tags associated with the task, and, when one of the one or more hash tags is selected by the user, may display, via the touch screen display, one or more points associated with the selected hash tag.

Furthermore, according to embodiments of the present disclosure, a trip scheduling method may include: determining, by a processor, a destination corresponding to a task entered by a user; displaying, by the processor, a user interface including a map and a chatting window for a user group including the user via a touch screen display electrically connected with the processor; and receiving, by the processor, an input associated with the user interface via the touch screen display for determining a trip for the user group.

The displaying may include displaying, by the processor, a map where destinations of respective users included in the user group are shown via the touch screen display, and the map may include information about at least a part of an expected required time or an expected price associated with each of the users included in the user group.

The method may further include changing, by the processor, the destination based on an input of the user, which is made to the map.

BRIEF DESCRIPTION OF THE DRAWINGS

The above and other objects, features and advantages of the present disclosure will be more apparent from the following detailed description taken in conjunction with the accompanying drawings.

Figure 1:
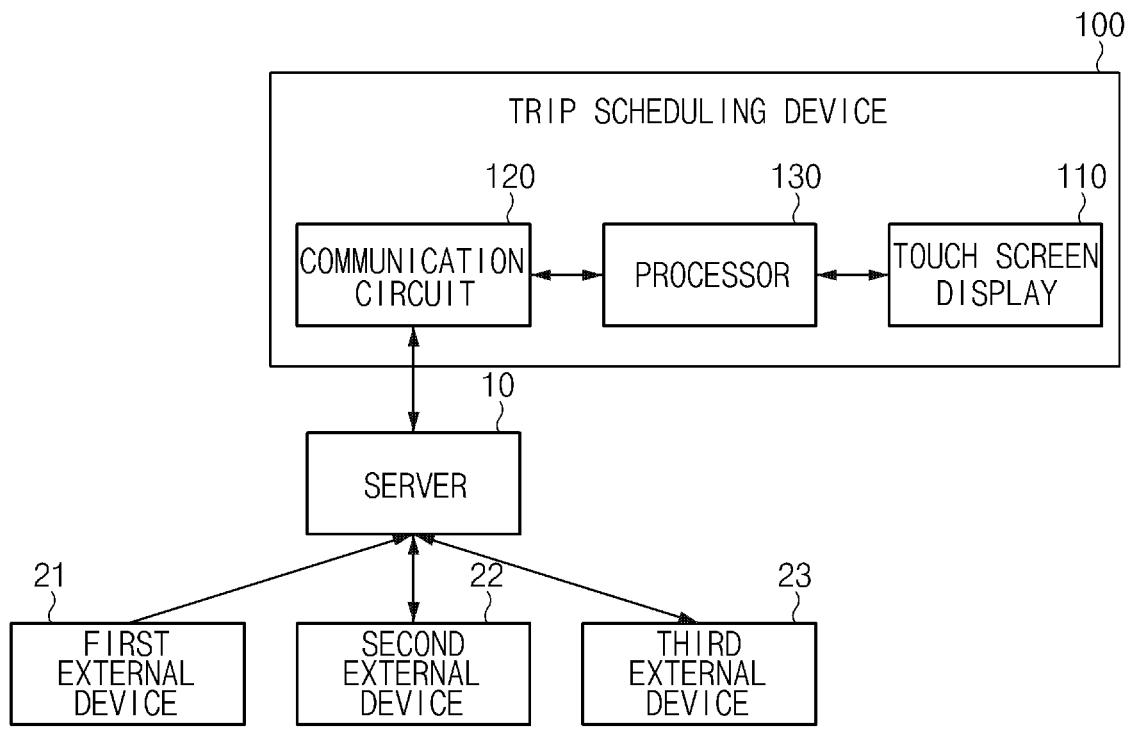
FIG. 1 is a block diagram illustrating a configuration of a trip scheduling device according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, FIG. 1 is a block diagram illustrating a configuration of a trip scheduling device according to embodiments of the present disclosure.

As shown in FIG. 1, a trip scheduling device 100 (for convenience of description, hereinafter referred to as a "device 100") may include a touch screen display 110, a communication circuit 120, and a processor 130. The device 100 may be, for example, a user terminal such as a smartphone, a tablet PC, a wearable device, or the like. For another example, the device 100 may be mounted in an autonomous vehicle.

The touch screen display 110 may function as an input device or an output device. The touch screen display 110 may receive various touch inputs from a user. The touch screen display 110 may output an image and may output various user interfaces.

The communication circuit 120 may be configured to communicate with the outside (e.g., a server 10, a first external device 21, a second external device 22, and/or a third external device 23). The communication circuit 120 may communicate with an external device (e.g., the first external device 21, the second external device 22, and/or the third external device 23) through the server 10 and may directly communicate with the external device. Three external devices are illustrated in FIG. 1. However, embodiments of the present disclosure may not be limited thereto. For example, the communication circuit 120 may communicate with any number of external devices. The server 10 may be a service providing server for providing a mobility service. The external device may be a personal terminal. Herein, the server 10 may be referred to as an "external device".

The processor 130 may be electrically connected with the touch screen display 110 and the communication circuit 120. The processor 130 may control the touch screen display 110 and the communication circuit 120 and may perform various data processing and calculation.

The processor 130 may determine a destination corresponding to a task that is entered by a user of the device 100. In detail, the processor 130 may receive a keyword associated with the task from the user through the touch screen display 110. The processor 130 may receive the keyword corresponding to the task that the user wants to perform. For example, the processor 130 may receive a keyword "Purchase groceries". The processor 130 may display one or more points for performing a task based on the keyword. The processor 130 may display one or more points, which are capable of performing the task corresponding to the keyword, on a map based on a map database. For example, the processor 130 may display a point where one or more marts capable of performing "Purchase groceries" are located, on the map.

The processor 130 may display one or more hash tags associated with a task. If one of the one or more hash tags is selected by the user, the processor 130 may display one or more points associated with the selected hash tag. For example, the processor 130 may display various hash tags associated with a task that the user is able to perform, in a task input screen. If one of the displayed hash tags is selected by the user, the processor 130 may display places associated with the selected hash tag.

The processor 130 may recommend one of one or more points based on the number of expected group members associated with each of the one or more points. The processor 130 may display a plurality of points capable of performing a task, on the map. The processor 130 may obtain information about destinations of other users by using the communication circuit 120 and may recommend a point, which is capable of being grouped with the most users, from among the plurality of points based on the destinations of the other users. The user of the device 100 may be grouped with more users by determining a destination based on a task, thereby reducing the price for the mobility service.

The processor 130 may display an expected required time with regard to each of one or more points. The processor 130 may display a plurality of points capable of performing a task, on the map. The processor 130 may display an expected time taken to arrive at each of the plurality of points, on the map.

When one of one or more points is selected by the user, the processor 130 may set the selected point to a destination. The processor 130 may receive a touch input of the user through the touch screen display 110. If a touch input associated with one of a plurality of points is received, the processor 130 may set the selected point to a destination of the user.

The processor 130 may display a user interface that includes a map and a chatting window for a user group including the user connected through the communication circuit 120, in the touch screen show 110. The processor 130 may communicate with a terminal (e.g., the first external device 21, the second external device 22, and/or the third external device 23) of a user group grouped by the server 10. The processor 130 may display a chatting window for conversation in the user group and a map indicating departure points and/or destinations of users included in the user group, in the touch screen display 110. The processor 130 may provide the chatting window and the map at the same time or individually.

The processor 130 may display the map where destinations and/or departure points of the users included in the user group are shown, in the touch screen display 110. The map may include information about at least a part of an expected required time or an expected price associated with each of the users included in the user group.

The user interface may include a confirmation button for receiving agreement intention associated with a trip from a user. The user interface may display whether the users included in the user group agree to the trip, based on an input, which is made to the confirmation button, of each user included in the user group.

The processor 130 may receive an input to the user interface through the touch screen display 110 for the purpose of determining the trip for the user group. The processor 130 may change a destination and/or a departure point based on a user's input to the map. For example, the processor 130 may move a pin indicating a destination and/or a departure point of a user depending on the user's input to the map and may again set a location of the moved pin to the destination and/or the departure point of the user. When the user moves a pin, a movable path of a vehicle may be adjusted. As the path is adjusted, a required time and a price of the user group may decrease. The processor 130 may change information about at least a part of an expected required time or an expected price associated with a user, based on a change of a destination and/or a departure point. The processor 130 may again calculate an expected required time and an expected price on the basis of the changed destination and/or departure point and may display the expected required time and the expected price thus calculated.

The processor 130 may change information about at least a part of an expected required time or an expected price associated with a user, based on a change of a destination and/or a departure point of another user. The processor 130 may receive information about the destination and/or the departure point of another user from a terminal of another user. The processor 130 may again calculate an expected required time and an expected price based on the changed destination and/or departure point of another user and may display the expected required time and the expected price thus calculated.

When it is determined that all the users included in the user group agree to the trip, the processor 130 may display a screen indicating finalization of the trip in the touch screen display 110. The processor 130 may confirm the agreement of all the users included in the user group from the server 10 and may display a message indicating the finalization of the trip in the touch screen display 110.

Figure 2:
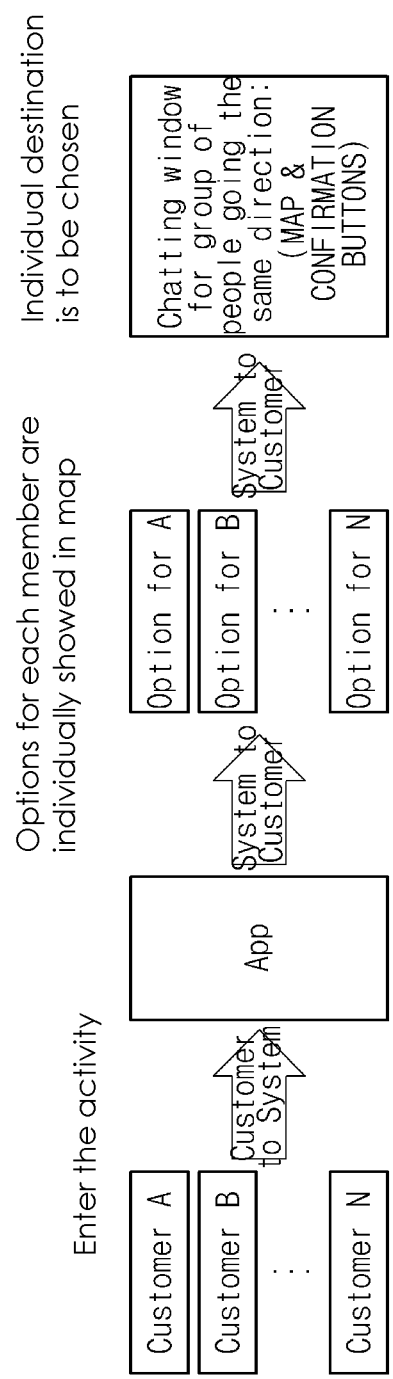
FIG. 2 is a block diagram for describing an exemplary operation of the trip scheduling device according to embodiments of the present disclosure.

FIG. 2 is a block diagram for describing an exemplary operation of the trip scheduling device according to embodiments of the present disclosure.

Below, it is assumed that the device 100 of FIG. 1 performs a process of FIG. 2. In addition, in a description of FIG. 2, it may be understood that an operation described as being performed by a device is controlled by the processor 130 of the device 100.

As shown in FIG. 2, a plurality of users (e.g., customer "A", customer "B", customer "N", and the like) may execute applications for providing a mobility service by using their own terminals. A user terminal may obtain an activity that a user wants to perform, through an application. The activities that a plurality of users enter may be sent to a system (e.g., a service providing server) for providing the mobility service through the applications.

The system may provide an option to each of the plurality of users. For example, the system may provide terminals of the plurality of users with a map where at least one or more places capable of performing the activity entered by each user are shown. The user terminal may output the map provided from the system. The user terminal may receive an input for selection of a destination on the map. The system may obtain information about the selected destination from the plurality of user terminals.

The system may group the plurality of users wanting to go in the same direction, based on the selected destination. The system may provide the user group with a chatting window for conversation between users included in the user group. The chatting window may include a map where destinations of the users are shown and may include a confirmation button for confirming agreement intentions of the users associated with the trip. The user terminal may output the chatting window provided from the system. Below, operations of the user terminal and the system may be additionally described with reference to FIG. 3.

Figure 3:
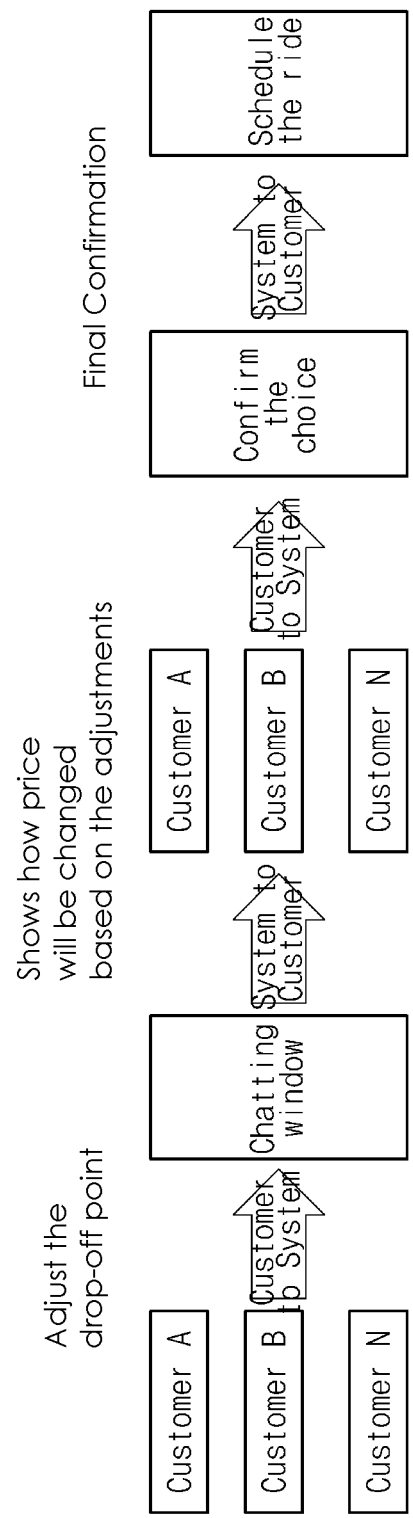
FIG. 3 is a block diagram for describing an exemplary operation of the trip scheduling device according to embodiments of the present disclosure.

FIG. 3 is a block diagram for describing an exemplary operation of a trip scheduling device according to embodiments of the present disclosure.

Below, it is assumed that the device 100 of FIG. 1 performs a process of FIG. 3. In addition, in a description of FIG. 3, it may be understood that an operation described as being performed by a device is controlled by the processor 130 of the device 100.

As shown in FIG. 3, a plurality of users (e.g., customer "A", customer "B", and customer "N") included in a user group may adjust destinations by using their own terminals. For example, a user terminal may display a pin indicating a destination of a user on a map included in a chatting window. The user terminal may adjust a location of the pin depending on an input of the user. The user terminal may set a location of the adjusted pin to a new destination. The user terminal may provide a system with information about the destination adjusted through the chatting window.

The system may again calculate a price of a mobility service based on the information about the adjusted destination. The system may send information about the calculated price to the user terminal. The user terminal may display the information of the received price on the map.

The user terminal may confirm agreement intention of the user associated with the trip based on an input to a confirmation button. The user terminal may notify the system of the input to the confirmation button. If it is determined that all the users included in the user group agree to the trip, the system may schedule the trip. The system may send the scheduled trip to the user terminal. The user terminal may output a message indicating finalization on the trip.

Figure 4:
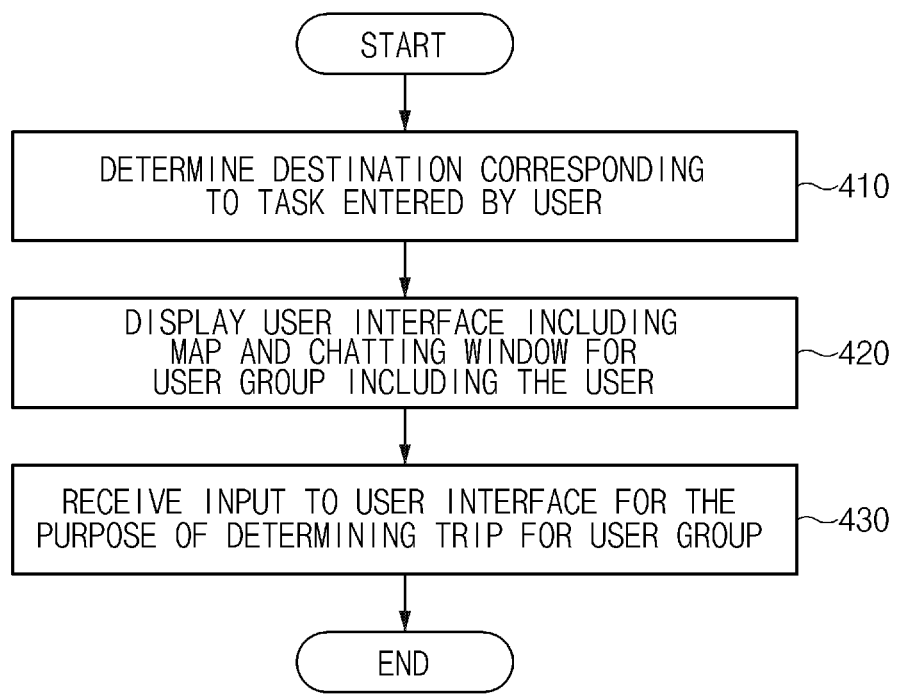
FIG. 4 is a flowchart for describing a trip scheduling method according to embodiments of the present disclosure.

FIG. 4 is a flowchart for describing a trip scheduling method according to embodiments of the present disclosure.

Below, it is assumed that the device 100 of FIG. 1 performs a process of FIG. 4. In addition, as described in FIG. 4, it may be understood that the operation described as being performed by a device is controlled by the processor 130 of the device 100.

As shown in FIG. 4, in operation 410, a device may determine a destination corresponding to a task entered by a user. For example, the device may receive a keyword corresponding to the task from the user. The device may obtain one or more places capable of performing the task based on the keyword and a database. The device may set a place selected by the user among the one or more places to a destination.

In operation S420, the device may display a user interface including a map and a chatting window for a user group including the user. For example, the device may output a user interface of a user group that is grouped based on a departure point and a destination provided from a mobility service providing system. The user interface may include, for example, a chatting window to show conversation for agreement between group members, a map showing a destination and/or a departure point of each group member, and a confirmation button for confirming agreement of a group member.

In operation S430, the device may receive an input to the user interface for the purpose of determining a trip for the user group. For example, the device may change a destination and/or a departure point depending on the input to the user interface. For another example, the device may send a message entered through the user interface. For another example, the device may send the agreement entered through the user interface. If all the group members agree to the trip, the device may output a screen indicating decision of the trip.

Figure 5:
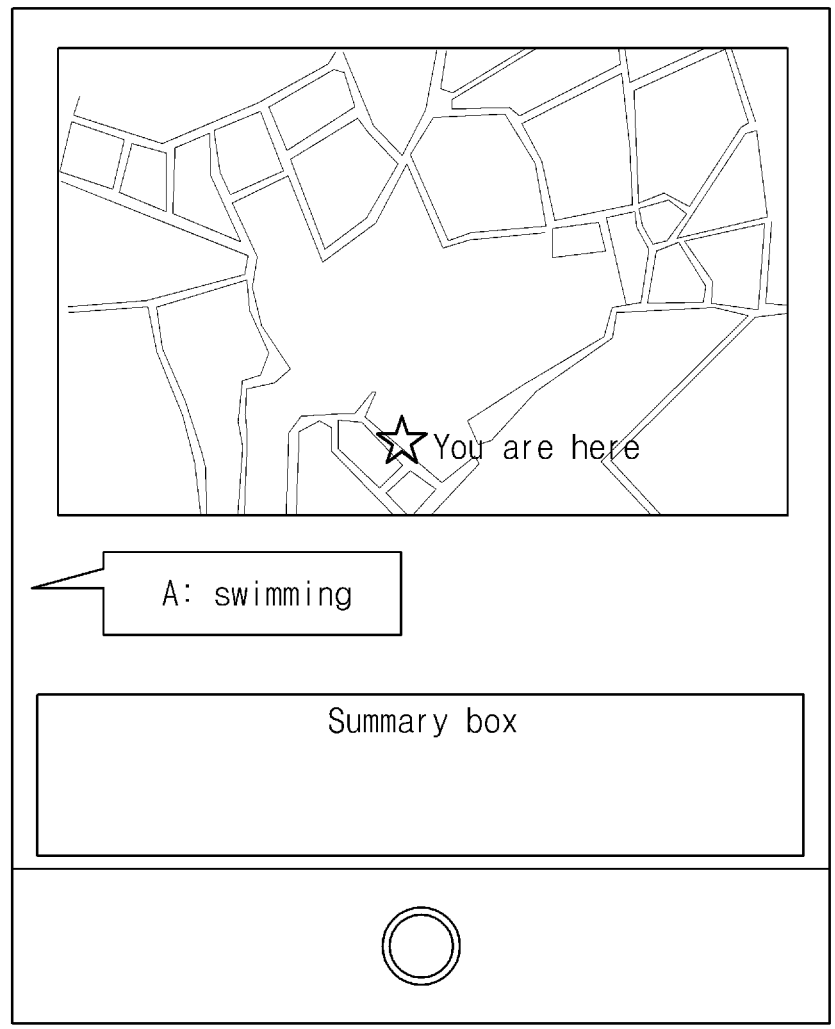
FIG. 5 illustrates an exemplary user interface provided in the trip scheduling device according to embodiments of the present disclosure.

FIG. 5 illustrates an exemplary user interface provided in a trip scheduling device according to embodiments of the present disclosure.

As shown in FIG. 5, a device according to embodiments of the present disclosure may store an application for a mobility service. If the application is executed, a device may display a map of a surrounding area of the device. The device may display a marker indicating a current location of the device on the map.

The device may receive a keyword corresponding to a task that the user wants to perform from the user. For example, the device may receive a keyword "swimming" from the user. The device may display the keyword "swimming" entered by the user.

The device may display a summary box notifying a current progress situation together with the map and the keyword.

Figure 6:
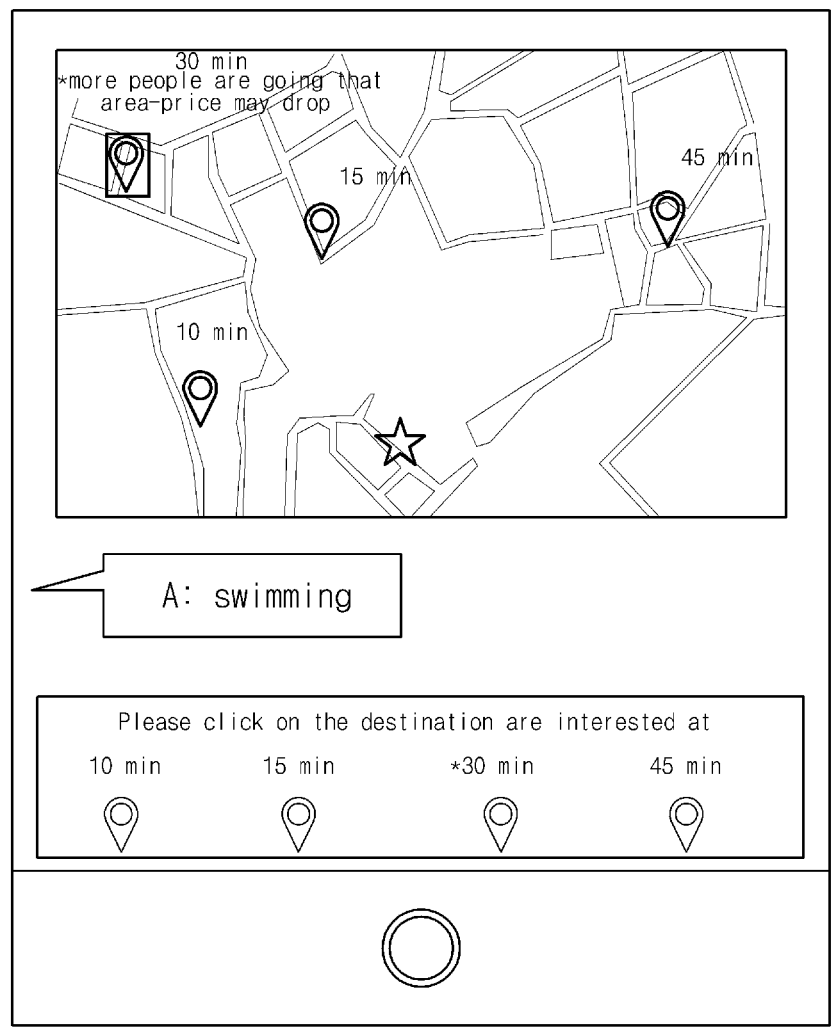
FIG. 6 illustrates an exemplary user interface provided in the trip scheduling device according to embodiments of the present disclosure.

FIG. 6 illustrates an exemplary user interface provided in a trip scheduling device according to embodiments of the present disclosure.

As shown in FIG. 6, a device according to embodiments of the present disclosure may search for places that are appropriate for swimming as a task that a user wants to perform. The device may search for places suitable for swimming based on a database stored in the device or data received from the outside. The device may display a marker indicating locations of four places suitable for swimming on the map. The device may display a time taken to arrive at each of the four places.

To reduce a usage price of a mobility service, the device may output a message to recommend a place, which enables grouping with more users, from among the four places. The device may display a place recommenced on the basis of a place that other users want to visit, on the map.

The device may receive a touch input associated with one of the four places displayed. If a touch input is made on one marker of the four markers, the device may set a place corresponding to the touched marker to a destination. The device may display information associated with the four places in the summary box. The device may mark the recommended place in the summary box with an asterisk. The device may receive an input for selecting a place through the summary box.

Figure 7:
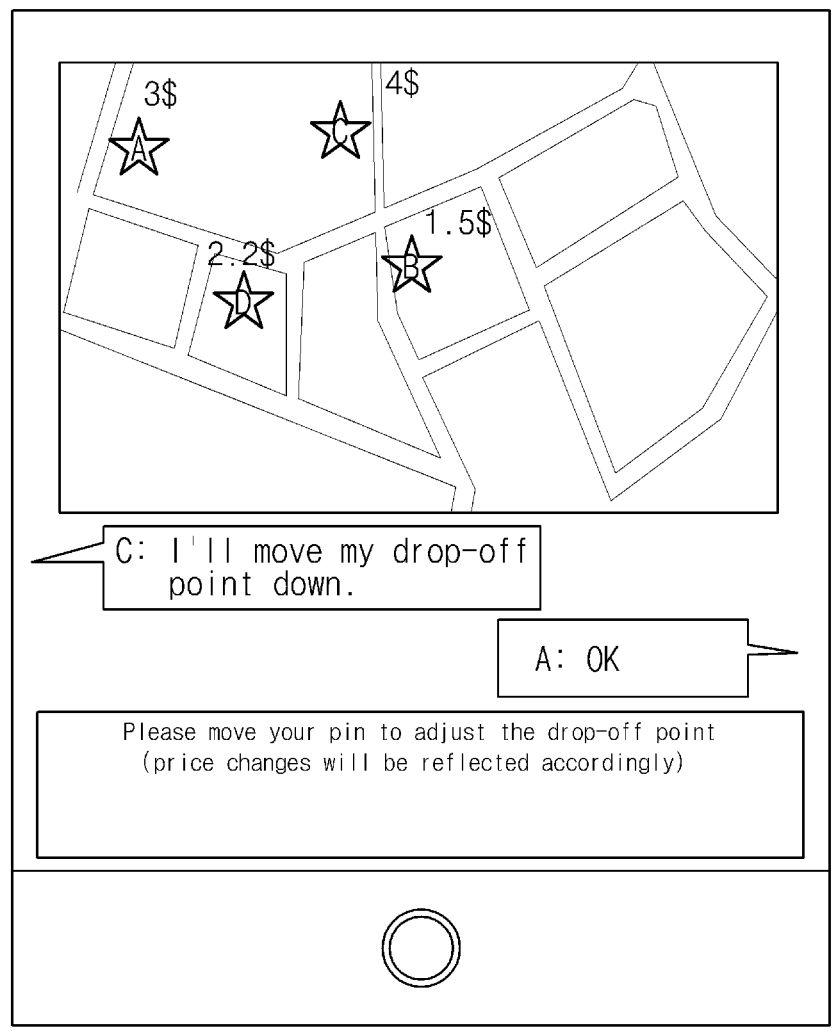
FIG. 7 illustrates an exemplary user interface provided in the trip scheduling device according to embodiments of the present disclosure.

FIG. 7 illustrates an exemplary user interface provided in a trip scheduling device according to embodiments of the present disclosure.

As shown in FIG. 7, a device according to embodiments of the present disclosure may output a user interface including a chatting window for conversation between user group members grouped on the basis of a destination and a map displaying destinations of the group members.

The device may display a conversation between the group members in the chatting window. For example, the device may display a message of a user "C" indicating that the user "C" will move a drop-off point down and a message of a user "A" indicating agreement to the movement of the drop-off point in the chatting window. The group members may easily exchange their own intentions with each other for the purpose of adjusting the trip.

The device may display a destination of each of the group members. The device may display a marker (or a pin) indicating a destination on the map. The device may display an expected price of the user corresponding to the mark, in the vicinity of the marker. For example, the device may display destinations and expected prices of the user "A", the user "B", the user "C", and the user "D" on the map.

The device may display a message indicating that a user can move a marker to adjust a drop-out point and a prince can be changed by the adjustment, in a summary box. For example, in the case where the user "C" moves a marker down, the device may move a marker indicating a destination of the user "C" and may change an expected price of the user "C".

A user(s) (e.g., the user "D") may withdraw from the user group in the process of exchanging opinions.

Figure 8:
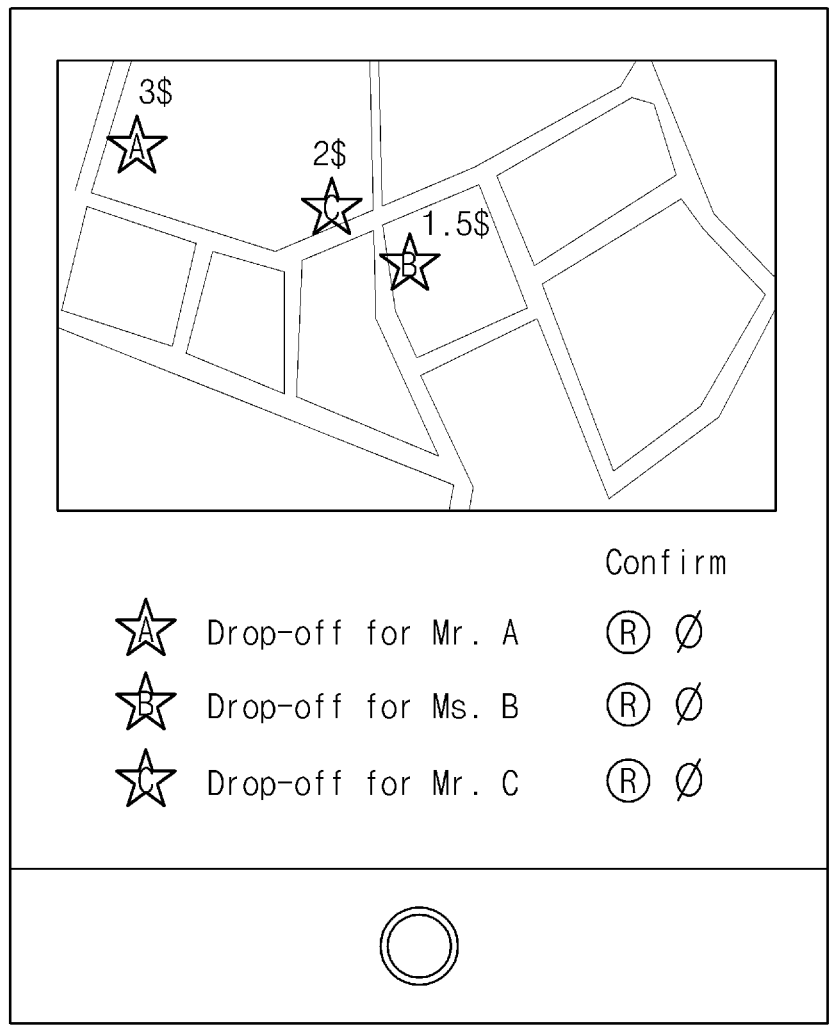
FIG. 8 illustrates an exemplary user interface provided in the trip scheduling device according to embodiments of the present disclosure.

FIG. 8 illustrates an exemplary user interface provided in a trip scheduling device according to embodiments of the present disclosure.

As shown in FIG. 8, a device according to embodiments of the present disclosure may output a user interface including a map showing destinations of group members and confirmation buttons for agreements of group members associated with a trip. The device may reflect a change of a drop-off point of a user "C" to display a drop-off point and an expected price of the user "C" on the map.

The user interface may display whether all the group members agree to the trip. The user interface may include a mark that is capable of identifying a user applying an input to the confirmation button. If each of all the group members applies an input to the confirmation button to agree to the trip, the trip may be finalized.

Figure 9:
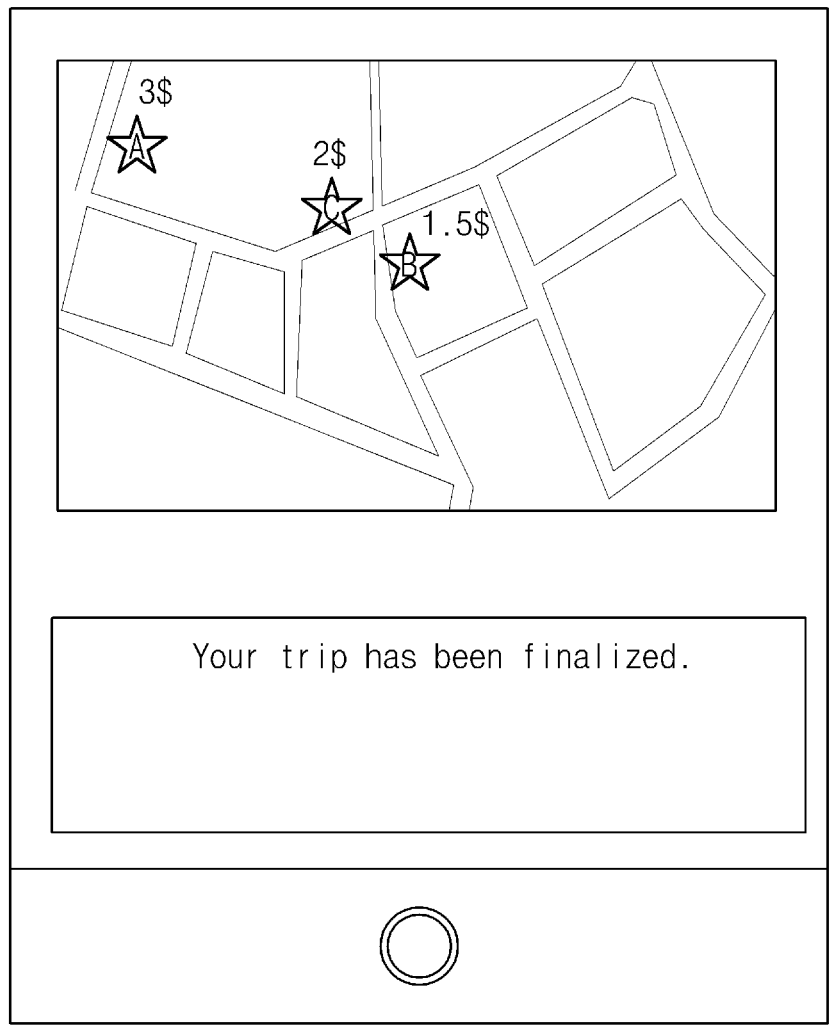
FIG. 9 illustrates an exemplary user interface provided in the trip scheduling device according to embodiments of the present disclosure.

FIG. 9 illustrates an exemplary user interface provided in a trip scheduling device according to embodiments of the present disclosure.

As shown in FIG. 9, a device according to embodiments of the present disclosure may send an input of each group member associated with a confirmation button to a system that provides a mobility service. If each group member applies an input to the confirmation button, a trip associated with a user group may be finalized. The system may send information indicating that the trip is finalized, to the device. If the trip is finalized, the device may output a message indicating that the trip is finalized, to a user in a summary box.

Figure 10:
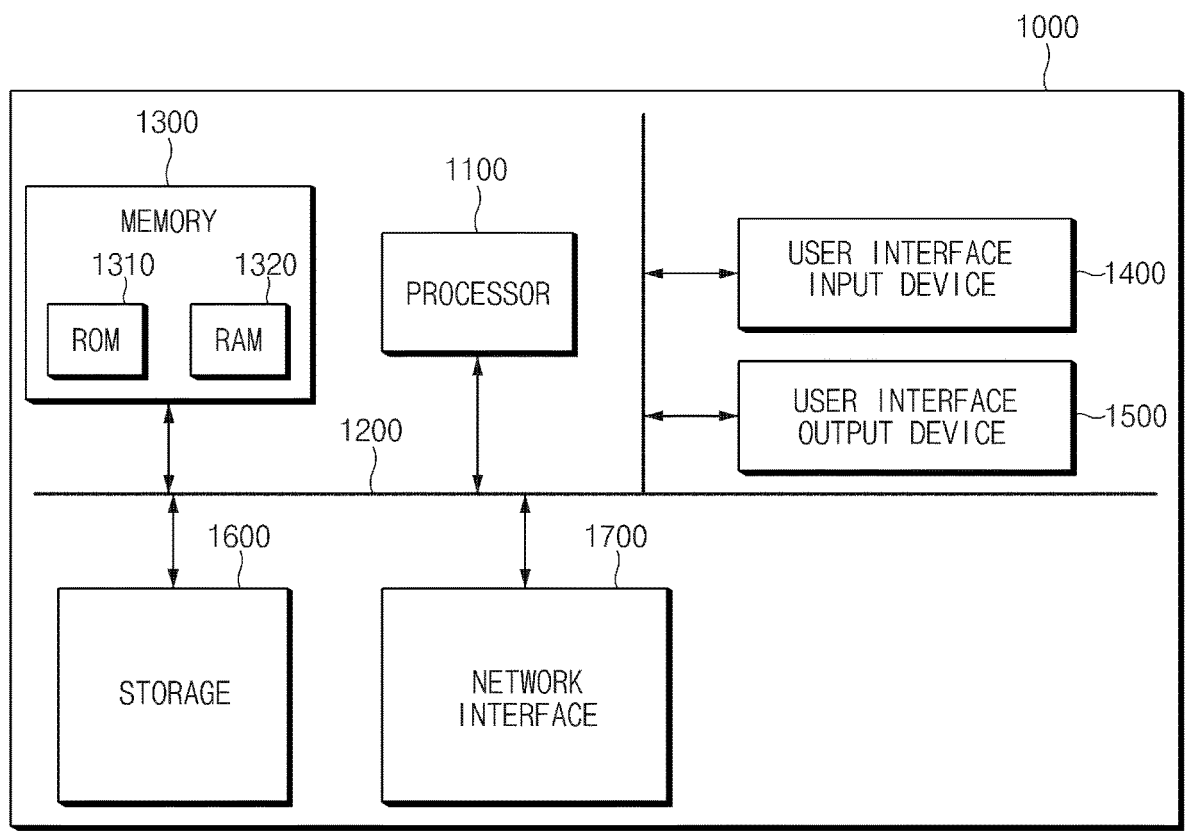
FIG. 10 illustrates a computing system according to embodiments of the present disclosure.

FIG. 10 illustrates a computing system according to embodiments of the present disclosure.

As shown in FIG. 10, a method according to embodiments of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to embodiments of the present disclosure, a device and a method for scheduling a trip may provide a user interface including a map and a chatting window to make agreement between users and adjustment of a destination (or a departure point) easy, thereby reducing a required time and a service price for a mobility service.

Also, the method and the device may propose a destination for grouping with more users based on a task that a user wants to perform, thereby reducing a price of the mobility service.

Although the present disclosure has been described with reference to certain embodiments and the accompanying drawings, the present disclosure is not limited thereto, but may be variously modified and altered by those skilled in the art to which the present disclosure pertains without departing from the spirit and scope of the present disclosure.

Therefore, embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A trip scheduling device comprising:
a touch screen display;
a communication circuit configured to communicate with an external device; and
a processor electrically connected with the touch screen display and the communication circuit,
wherein the processor is configured to:
determine a destination corresponding to a task entered by a user of the device;
display, via the touch screen display, a user interface including a map and a chatting window for a user group including the user connected by the communication circuit; and
receive, via the touch screen display, an input associated with the user interface for determining a trip for the user group, and
wherein the processor is further configured to:
display, via the touch screen display, a map where destinations of respective users included in the user group are shown, and
wherein the map includes information about at least a part of an expected required time or an expected price for each of the users included in the user group.

2. The device of claim 1, wherein the processor is further configured to:
receive, via the touch screen display, a keyword associated with the task from the user;
display, via the touch screen display, one or more points for performing the task based on the keyword; and
when one of the one or more points is selected by the user, set the selected point to the destination.

3. The device of claim 2, wherein the processor is further configured to:
recommend one of the one or more points based on a number of expected group members for each of the one or more points.

4. The device of claim 2, wherein the processor is further configured to:
display, via the touch screen display, an expected required time for each of the one or more points.

5. The device of claim 1, wherein the processor is further configured to:
display, via the touch screen display, a map where destinations of respective users included in the user group are shown.

6. The device of claim 1, wherein the processor is further configured to:
display, via the touch screen display, the chatting window and the map at the same time.

7. The device of claim 1, wherein the processor is further configured to:
display, via the touch screen display, the chatting window and the map individually.

8. The device of claim 1, wherein the processor is further configured to:
change the destination based on an input of the user, which is made to the map.

9. The device of claim 8, wherein the processor is further configured to:
change the information about at least a part of the expected required time or the expected price for the user based on the changed destination.

10. The device of claim 1, wherein the processor is further configured to:
display, via the touch screen display, a map where destinations and departure points of respective users included in the user group are shown.

11. The device of claim 10, wherein the processor is further configured to:
change a departure point of the user based on an input of the user, which is made to the map.

12. The device of claim 11, wherein the processor is further configured to:
change the information about at least a part of the expected required time or the expected price for the user based on the changed departure point.

13. The device of claim 1, wherein the user interface includes:
a confirmation button for receiving an agreement intention associated with the trip from the user.

14. The device of claim 1, wherein the user interface indicates whether users included in the user group agree to the trip.

15. The device of claim 1, wherein the processor is further configured to:
when it is determined that all users including in the user group agree to the trip, display, via the touch screen display, a screen indicating finalization of the trip.

16. The device of claim 1, wherein the processor is further configured to:
display, via the touch screen display, one or more hash tags associated with the task; and
when one of the one or more hash tags is selected by the user, display, via the touch screen display, one or more points associated with the selected hash tag.

17. A trip scheduling method comprising:
determining, by a processor, a destination corresponding to a task entered by a user;
displaying, by the processor, a user interface including a map and a chatting window for a user group including the user via a touch screen display electrically connected with the processor; and
receiving, by the processor, an input associated with the user interface via the touch screen display for determining a trip for the user group,
wherein the displaying comprises:
displaying, by the processor, a map where destinations of respective users included in the user group are shown via the touch screen display, and
wherein the ma includes information about at least a art of an expected required time or an expected price for each of the users included in the user group.

18. The method of claim 17, further comprising:
changing, by the processor, the destination based on an input of the user, which is made to the map.

* * * * *